US010796346B2

(12) United States Patent
Yu et al.

(10) Patent No.: US 10,796,346 B2
(45) Date of Patent: Oct. 6, 2020

(54) METHOD AND SYSTEM FOR UNUSUAL USAGE REPORTING

(71) Applicant: Opower, Inc., Arlington, VA (US)

(72) Inventors: Janet Yu, San Francisco, CA (US); Tom Mercer, San Francisco, CA (US); Eric Chang, Menlo Park, CA (US); Richard Tyler Curtis, Washington, DC (US); Daniel J. Yates, Washington, DC (US)

(73) Assignee: Opower, Inc., Redwood Shores, CA (US)

(*) Notice: Subject to any disclaimer, the term of this patent is extended or adjusted under 35 U.S.C. 154(b) by 629 days.

(21) Appl. No.: 13/765,045

(22) Filed: Feb. 12, 2013

(65) Prior Publication Data

US 2014/0006314 A1    Jan. 2, 2014

Related U.S. Application Data

(60) Provisional application No. 61/665,189, filed on Jun. 27, 2012, provisional application No. 61/722,334, filed on Nov. 5, 2012.

(51) Int. Cl.
*G06Q 30/02* (2012.01)
(52) U.S. Cl.
CPC ......... *G06Q 30/0283* (2013.01); *G06Q 30/02* (2013.01)
(58) Field of Classification Search
CPC .... G06Q 50/06; Y02B 70/3225; Y02B 60/50; Y04S 20/222; Y04S 10/54
See application file for complete search history.

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

The brattle group; net benefits of smart meters could range from $96 to $287 million over 20 years for utilities with a million customers according to study led by the brattle group. (Mar. 1, 2011). Technology & Business Journal Retrieved from https://dialog.proquest.com/ (Year: 2011).*

(Continued)

*Primary Examiner* — Michael P Harrington
(74) *Attorney, Agent, or Firm* — Kraguljac Law Group, LLC

(57) ABSTRACT

Illustrative embodiments of the present invention are directed to methods and computer systems for reporting unusual or anomalous usage or spending of a commodity by consumers. A computer system retrieves a set of usage-information datasets corresponding to a set of consumers, each dataset including past usage of the commodity during at least one of a completed billing period and a current usage of the commodity during the current billing period. The computer system establishes a set of report-trigger conditions for the current billing period, each of the report-trigger conditions corresponding to a consumer. The computer system monitor usage or spending of the set of consumers to determine, for each consumer, whether an estimated usage established for each consumer fulfills the consumer's report-trigger condition. Once the report-trigger condition is fulfilled, the computer system outputs a report to the consumer.

25 Claims, 11 Drawing Sheets

(56) References Cited

U.S. PATENT DOCUMENTS

| | | |
|---|---|---|
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam |
| 8,166,047 B1 | 4/2012 | Cohen et al. |
| 8,180,591 B2 | 5/2012 | Yuen et al. |
| 8,239,178 B2 | 8/2012 | Gray et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| 8,751,432 B2 | 6/2014 | Berg-Sonne et al. |
| 8,805,000 B2 | 8/2014 | Derby et al. |
| 9,031,703 B2 | 5/2015 | Nakamura et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0120452 A1* | 6/2003 | Doel ................ G05B 23/0235 702/127 |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2007/0061735 A1 | 3/2007 | Hoffberg et al. |
| 2007/0203860 A1* | 8/2007 | Golden et al. ............ 705/412 |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0167535 A1 | 7/2008 | Stivoric et al. |
| 2008/0195561 A1 | 8/2008 | Herzig |
| 2008/0281473 A1 | 11/2008 | Pitt |
| 2008/0281763 A1 | 11/2008 | Yliniemi |
| 2008/0306985 A1 | 12/2008 | Murray et al. |
| 2009/0106202 A1 | 4/2009 | Mizrahi |
| 2009/0204267 A1 | 8/2009 | Sustaeta et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0153103 A1* | 6/2011 | Brown ................ G06Q 10/04 700/291 |
| 2011/0178842 A1 | 7/2011 | Rane et al. |
| 2011/0178937 A1 | 7/2011 | Bowman ................ 705/314 |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. .................. 702/61 |
| 2011/0282505 A1 | 11/2011 | Tomita et al. |
| 2011/0313964 A1* | 12/2011 | Sanchey Loureda .. G01D 4/002 706/50 |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0215369 A1* | 8/2012 | Desai et al. ................ 700/291 |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0227846 A1 | 8/2015 | Mercer et al. |
| 2015/0267935 A1 | 9/2015 | Devenish et al. |
| 2015/0269664 A1 | 9/2015 | Davidson |
| 2015/0310019 A1 | 10/2015 | Royer et al. |
| 2015/0310463 A1 | 10/2015 | Turfboer et al. |
| 2015/0310465 A1 | 10/2015 | Chan et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |

(56) References Cited

FOREIGN PATENT DOCUMENTS

| | | |
|---|---|---|
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

Calico energy services; calico energy solution to enable Chicago suburb to realize a city-wide, energy-efficient smart grid. (Feb. 11, 2011). Energy Weekly News Retrieved from https://dialog.proquest.com/professional/docview/848719225?accountid=131444 (Year: 2011).*

International Searching Authority, International Search Report—International Application No. PCT/US13/46126, dated Aug. 22, 2013, together with the Written Opinion of the International Searching Authority, 14 pages.

Mint.com, "Budgets you'll actually stick to," Budgeting—Calculate and Categorize your spending, https://www.mint.com/how-it-works/budgeting/, 2 pages, Jul. 12, 2013.

Mint.com, "We're always on alert." Alerts for bills, fees & going over budget, https://www.mint.com/how-it-works/alerts/ , 2 pages, Jul. 12, 2013.

TXU Energy Retail Company LLC, "TXU Energy Budget Alerts Give Consumers Control of Electricity Costs," TXU Energy, http://www.txu.com/es/about/press, 2 pages, May 23, 2012.

International Search Report and Written Opinion for PCT Application No. PCT/US2015/038692, dated Sep. 24, 2015, 13 pages.

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May 19, 2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Chen, Hanfeng, et al., "Testing for a Finite Mixture Model With Two Components," Journal of the Royal Statistical Society, Series B, vol. 66, No. 1, 26 pages, 2004.

Deb, Partha, "Finite Mixture Models," Hunter College and the Graduate Center, CUNY NBER, FMM Slides, 42 pages, Jul. 2008.

D'Urso, M., et al., "A Simple Strategy for Life Signs Detection via an X-Band Experimental Set-Up," Progress in Electromagnectics Research C, vol. 9, pp. 119-129 (2009).

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Fels, Margaret F., "PRISM: An Introduction," Elsevier Sequoia, Energy and Buildings, vol. 9, pp. 5-18, 1986.

Fels, Margaret F., et al., Seasonality of Non-heating Consumption and Its effect on PRISM Results, Elsevier Sequoia, Energy and Buildings, vol. 9, pp. 139-148, 1986.

Figueiredo, Vera, et al., "An Electric Energy Consumer Characterization Framework Based on Data Mining Techniques," IEEE Transactions on Power Systems, vol. 20, No. 2, pp. 596-602, May 2005.

Fitbit® Official Site, "Flex, One & Zip Wireless Activity & Sleep Trackers," http://www.fitbit.com/, 4 pages, Jul. 15, 2013.

Friedman, Jerome, et al., "Regularization Paths for Generalized Linear Models via Coordinate Descent," Journal of Statistical Software, vol. 33, Iss. 1, pp. 1-22, Jan. 2010.

Goldberg, Miriam L., et al., "Refraction of PRISM Results into Components of Saved Energy," Elsevier Sequoia, Energy and Buildings, vol. 9, pp. 169-180, 1986.

Jansen, R.C., "Maximum Likelihood in a Generalized Linear Finite Mixture Model by Using the EM Algorithm," Biometrics, vol. 49, pp. 227-231, Mar. 1993.

Jawbone, "Know yourself. Live better." https://jawbone.com/up/, 7 pages, Jul. 15, 2013.

Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.

Liang, Jian, et al. "Load Signature Study—Part II: Disaggregation Framework, Simulation, and Applications," IEEE Transactions on Power Delivery, vol. 25, No. 2, pp. 561-569, Apr. 2010.

Liang, Jian, et al., "Load Signature Study—Part I: Basic Concept, Structure, and Methodology," IEEE Transactions on Power Delivery, vol. 25, No. 2, pp. 551-560, Apr. 2010.

Mori, Hiroyuki, "State-of-the-Art Overview on Data Mining in Power Systems," IEEE, pp. 33-37, 2006.

Muthen, Bengt, et al., Finite Mixture Modeling with Mixture Outcomes Using the EM Algorithm, Biometrics, vol. 55, pp. 463-469, Jun. 1999.

Nest, "The Learning Thermostat," http://www.nest.com/, 2 pages, Jul. 15, 2013.

(56) References Cited

OTHER PUBLICATIONS

Nike.com, "Nike + FuelBand. Tracks your all-day activity and helps you do more . . . ," http://www.nike.com/us/en_us/c/nikeplus-f.. uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.

\* cited by examiner

METHOD AND SYSTEM FOR UNUSUAL USAGE REPORTING

RELATED APPLICATION

The present application claims priority from Provisional Application No. 61/665,189, filed Jun. 27, 2012 and Provisional Application No. 61/722,334, filed Nov. 5, 2012. These applications are incorporated herein by reference.

TECHNICAL FIELD

The present invention relates to commodity-use reporting, more particularly to the reporting of consumer's commodity usage.

SUMMARY OF THE PREFERRED EMBODIMENTS

In accordance with illustrative embodiments, a computer-implemented method is provided for reducing a usage or cost of a commodity by reporting to consumers of their unusual usage of the commodity during a current billing period. The computer system retrieves a set of usage-information datasets corresponding to a set of consumers. Each dataset may include a) past usage of the commodity during at least one of a completed billing period that may correspond to a period of similar seasonality as the current billing period and b) a current usage of the commodity during a completed portion of the current billing period. The commodity refers to a utility-based commodity, such as electricity, water, gas, or an aggregation of several resources, such as total energy.

The computer system establishes a set of report-trigger conditions for a set of consumers for the current billing period, each of the report-trigger conditions corresponding to a consumer. In the various embodiments, the computer system may establish the report-trigger condition once for each billing period, such as at the start of the current billing period or before. The report-trigger condition may include at least one unusual usage condition and at least one permissive condition. An unusual usage condition may be defined as an estimated usage for the current bill period exceeding a specified percentage of a baseline defined based on the past usage. This specified percentage may be between 100 percent and 150 percent. An unusual usage condition may also be defined as an estimated usage for a remaining portion of current billing period exceeding a usage threshold defined by the past usage scaled by the specified percentage. Unusual usage conditions may further be defined in terms of an expected cost or an environmental impact. A permissive condition may include a) the consumer's consent to receive the report, b) the report being the first to be sent within the billing period, and c) the unusual condition occurring in an actionable window during the billing period. This actionable window maybe during portions of the billing period that the user may act to curb their usage. For example, in a four-week billing period, the actionable window may include the second and third week of that period.

The computer system may continuously or intermittently monitor usage or spending of the set of consumers to determine, for each consumer, whether their estimated usage, established for each consumer, fulfills their respective consumer's report-trigger condition. The computer system may determine the estimated usage based on a) usage for the completed portion of the current billing period and b) a forecast of the usage for the remaining portion of the current billing period. The forecast may be based upon a moving or trailing history window that may vary between a five-day and ten-day period.

Upon the estimated usage fulfilling the report-trigger condition for a respective consumer, the computer system outputs a report to the consumer. The report may include generating an electronic message or outputting a signal to an intermediary service that sends the report to the consumer. The computer system may transmit, or cause the transmission of, the report to a receiving consumer as an electronic message, such as short message services (SMS), automated voice-messaging service, and electronic mail ("e-mail"). Alternatively, the computer system may transmit, or cause the transmission of, electronic signals to electronic devices located at a consumer's premises to be displayed or relayed and then displayed to the consumer. These electronic devices may include thermostats or a utility meters that communicate with a device operating as a user portal at the premises. The report may include the unusual usage of the commodity such as unusual high cost, unexpected costs, high usage, or higher than expected environmental impact and/or carbon footprint.

In accordance with other embodiments of the invention, the computer-implemented method may detect an unusual usage by the consumer of the commodity, where the measured usage takes into account cost. The method may include retrieving a set of usage-information datasets where each of the dataset may correspond to the usage of the commodity by a consumer. The computer system may retrieve a cost-rate dataset for the current billing period, which may be price-tiers or time-of-use pricing. The computer system may establish a set of report-trigger conditions for a set of consumers for the current billing period where each of the report-trigger condition corresponds to a respective consumer. The report-trigger condition may be derived from the past usage data and the pricing data. The report-trigger condition may include a usage-trigger condition and a cost-trigger condition. The computer system may determine, for each consumer, whether an estimated cost that has been established for the respective consumer for that current billing period fulfills the cost-trigger condition, e.g., the estimated cost exceeds an unusual cost setpoint. The computer system may also determine whether an estimated usage established for the same consumer has also been exceeded (i.e., a usage-trigger condition). The computer system may output or cause to output a report to the consumer if both the usage-trigger and the cost-trigger conditions are fulfilled.

The described method may be employed as a computer program product, which is stored on a machine-readable medium, or computer data signal, embodied by an electromagnetic wave, comprising program code to be executed, particularly, in a computer.

BRIEF DESCRIPTION OF THE DRAWINGS

The foregoing features of embodiments will be more readily understood by references to the following detailed description, taken with reference to the accompanying drawings, in which.

DETAILED DESCRIPTION OF SPECIFIC EMBODIMENTS

Providing an alert of unusual or anomalous utility usage allows consumers to manage their finances while promoting conservation. Consumers may set thresholds of when an alert or report would be sent. However, the thresholds by themselves are insufficient in curbing consumers' spending behavior. For example, the threshold may trigger an alert or report that may be late. When a significant portion of the billing period remains, the consumers may need to continue to spend or use the commodity. Consumers may set a lower threshold in order to receive an earlier warning. However, in order to do so, the consumers would have to understand their usage patterns to set the proper setpoint. Further compounding this problem is the variability in the consumers' usage patterns and the effects from seasonality.

Illustrative embodiments are directed to computer-implemented methods and systems for reporting unusual or anomalous usage of a commodity by consumers. In various illustrative embodiments, a report is provided to the consumers or to a utility or report service provider to relay to the consumers. The report may be electronic or may be generated as a physical hard copy that is mailed to the consumers. Illustrative embodiments further define usage patterns that constitute as being unusual while accounting for seasonality and allowing for the earlier detection of certain usage to curb the consumers' usage or spending.

As used herein, the term "report" generally refers to a signal that results in a visual or an audible indication. Report also refers to the transmission of a signal that results in the giving of such an indication.

The term "usage" refers to a quantity of use, a cost associated with the use, or a quantified metric representing the use or cost, such as environmental impact.

The term "commodity" refers to a utility-based commodity, such as electricity, water, and natural gas, which are consumable finite resources delivered to a fixed structure. Commodity also refers an aggregation of such resources, such as total energy.

Figure 1:
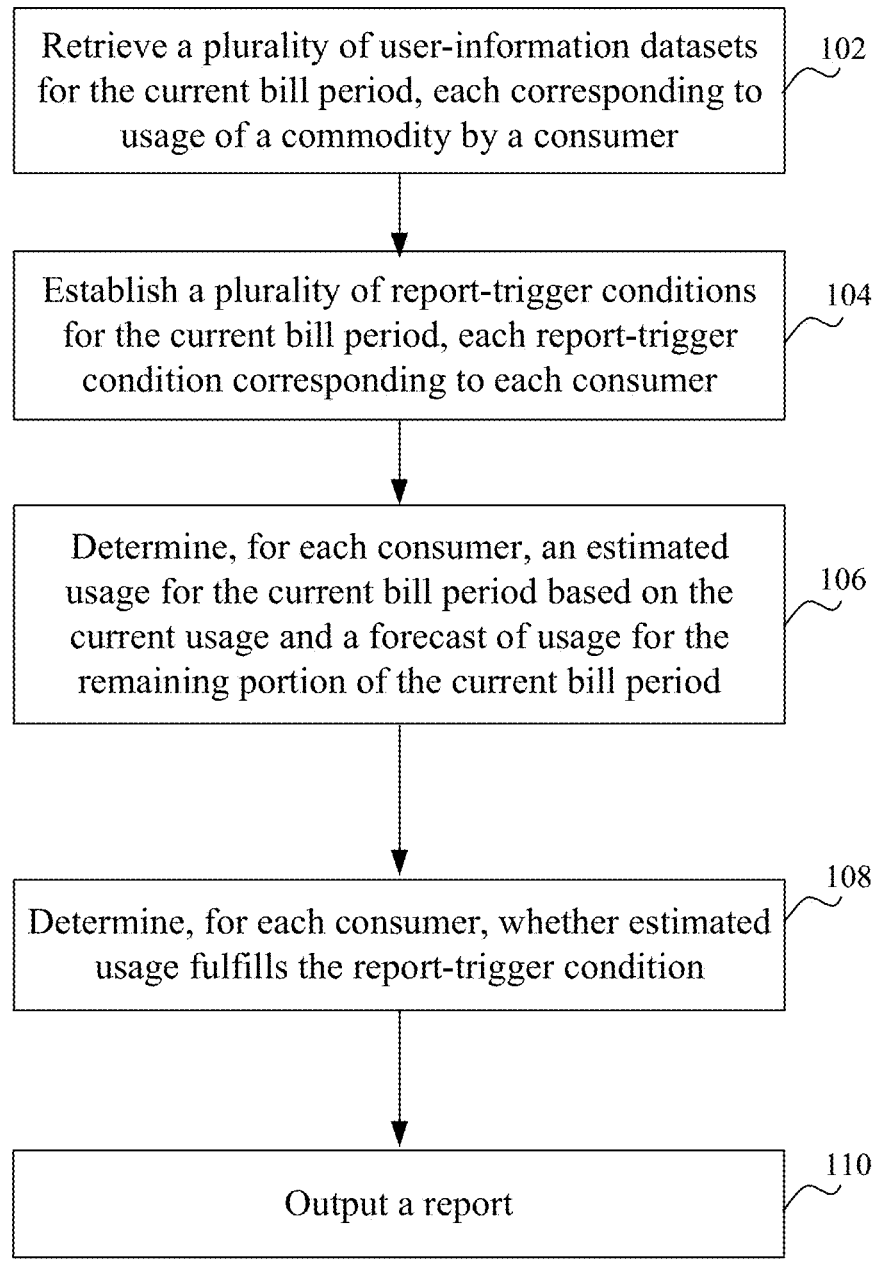
FIG. 1 is a flowchart illustrating a computer-implemented method of reducing a usage or cost of a commodity by reporting to a consumer of an unusual usage of the commodity according to the illustrative embodiment.

FIG. 1 is a schematic flowchart illustrating a computer-implemented method 100 of reducing a usage or cost of a commodity by reporting to a consumer of an unusual usage of the commodity according to the illustrative embodiment. The operation is performed during and for a current billing period. Typically, a utility company bills a consumer at the end of a usage period. As such, the current billing period refers to the time in which the consumer is consuming the commodity to be billed.

The method includes a computer system retrieving 102 a set of usage-information datasets, each corresponding to the usage of the commodity by a set of consumers. For example, the usage-information dataset may include a) past usage of the commodity for a completed billing period and b) a current usage of the commodity during a completed portion of the current billing period.

The computer system may retrieve past usage data from a consumer's old utility bills. These old utility bills may be referred herein as completed billing periods. These bills may be stored in a database operated by the utility, by an archival provider, or by a service provider that sends the unusual usage report to the consumer. Past usage data may also be stored-meter readings that correspond to consumption of the commodity by the consumer.

The current usage of the commodity refers to the most recent, i.e., the last reading (or the last series of readings), from a usage monitoring device (i.e., a utility meter). Current usage may be referred in temporal terms, such as being within the last hour or day. The meter reading may be performed by a utility company or an independent service provider that provides the meter reading to the utility.

The computer system may perform this monitoring operation at a defined schedule during the billing period, such as at every hour, fractions of the hour or day, daily, or weekly. Alternatively, the computer system may perform this monitoring operation at specified events, such as when new usage data is retrieved from the meter or made available from a utility database. The computer system may also perform the monitor operation at a specified portion of the current billing period, such as during the middle of the billing period.

In the various embodiments, the computer system may retrieve current usage data from a database. The current usage data may be a meter reading, but may also be other usage collection device on the premises, such thermostats, sub-meters, and energy management systems.

Past usage for a consumer may also be derived from other consumers. In instances where a consumer has a limited usage history, such as at the beginning of a new service with the utility company, the computer system may use historical usage data of other consumers that have similar home characteristics to form the past usage for this new consumer. These home characteristics may include information, such as size of the premises (in square feet), number of occupants, general age of the premises, dwelling type, presence of a pool, meter reading cycle, distance from each other, and geographic location. In such embodiments, the computer system may analyze datasets of multiple consumers having several or all of these characteristics. Alternatively, the utility company may have estimates of past usage based on geographic location. These estimates may also serve as past usage data for new consumers.

Figure 2A:
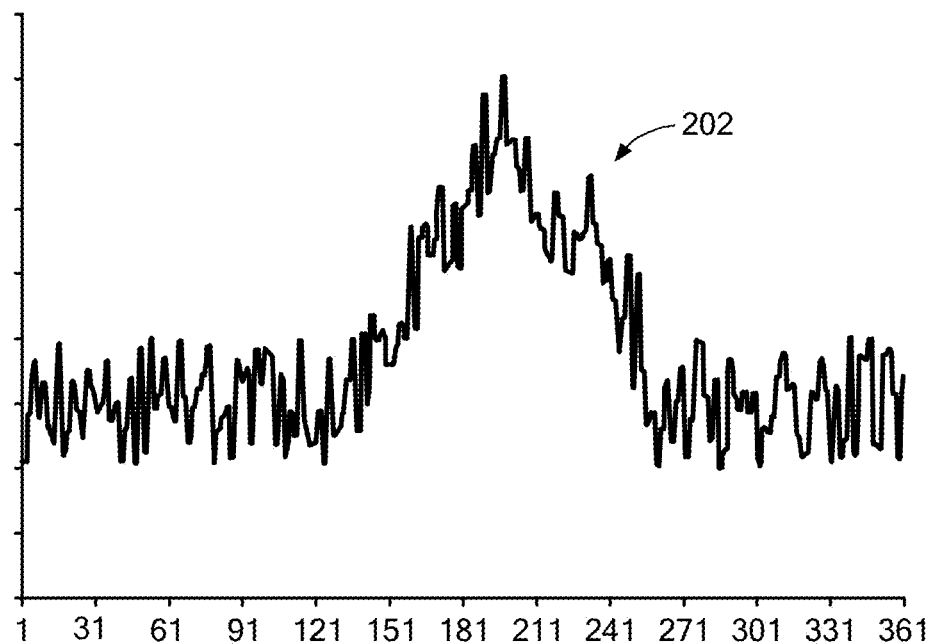
FIG. 2A shows a plot of a daily usage of electricity for a given consumer over a given year.
Figure 2B:
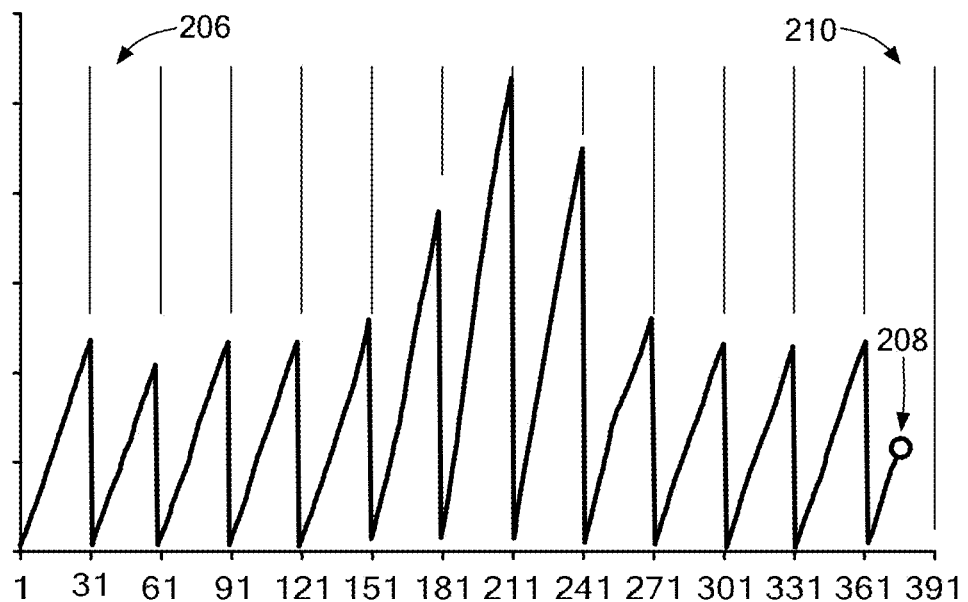
FIG. 2B shows the usage of FIG. 2A cumulated for each billing cycle.

Generally, a premises is equipped with a meter to monitor the usage of the commodity at the premises. A utility company providing the commodity to the premises typically performs a read of the meter in each billing cycle, typically on a monthly basis. FIG. 2A shows a sample plot of a daily usage 202 of electricity for a given consumer over a given year. FIG. 2B shows the usage of FIG. 2A cumulated for each billing cycle 206. The current usage 208 of the present billing period 210 may be referred to as the current usage of the commodity during a completed portion of the current billing period.

The computer system may establish 104 a report-trigger condition for the current billing period at the beginning or before the period, preferably before the beginning of the period. Alternatively, the report-trigger condition may be established during the current billing period, such as immediately before the report-trigger condition is used in the monitoring for unusual usage. This report-trigger condition is based at least in part from the past usage in the usage-information dataset.

Figure 3:
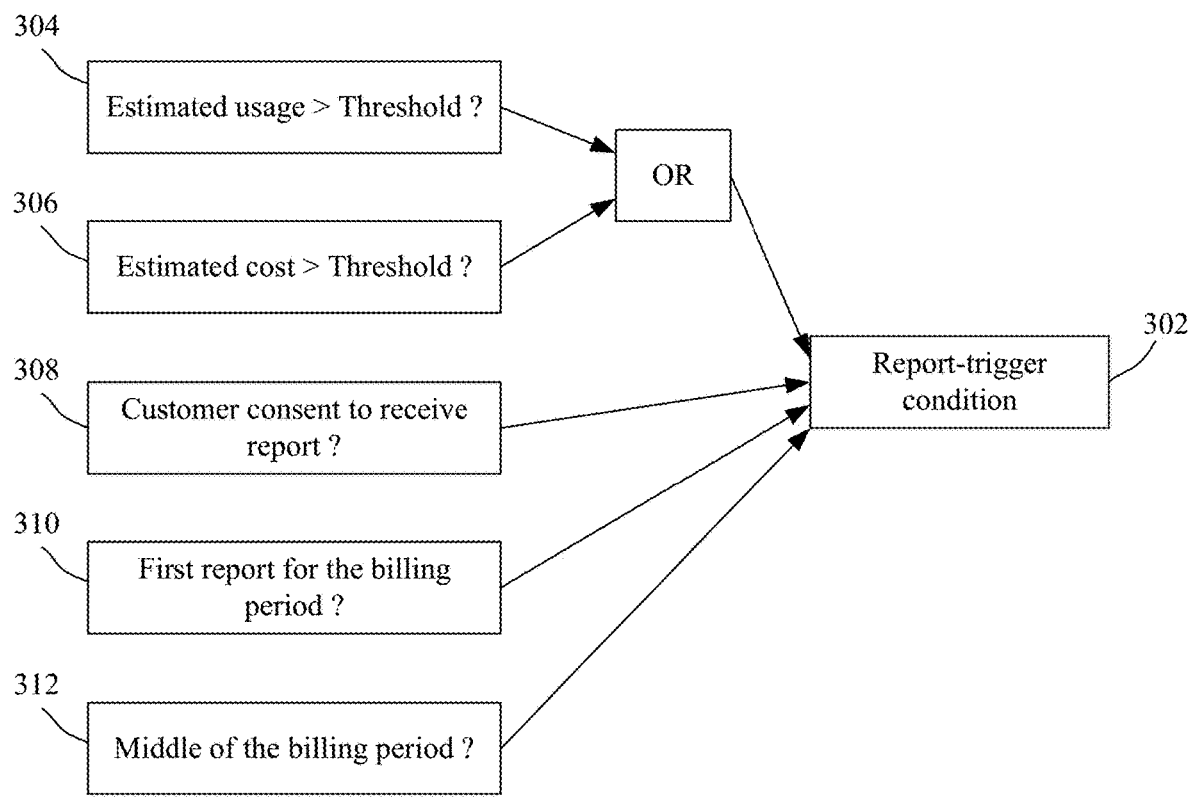
FIG. 3 is a diagram of report-trigger conditions according to the illustrative embodiment.

FIG. 3 is a diagram of report-trigger conditions according to the illustrative embodiment. The report-trigger condition 302 may include a set of conditions, such as triggering conditions as well as permissive conditions. A triggering condition refers to the unusual or anomalous condition to be monitored. More than one triggering conditions may be in a report-trigger condition. For example, a triggering condition may be based upon usage, cost, and/or environmental impact. The triggering conditions may be independently employed or in combinations. A triggering condition 304 based on usage may be defined by Eqn. 1, where the triggering condition is the actual usage of the commodity, $U^i_{actual}$, exceeding the unusual usage profile, $U^i_{unusual}$, at "time i."

$$\text{Triggering condition} = U^i_{actual} > U^i_{unusual} \quad \text{(Eqn. 1)}$$

The actual usage, $U^i_{actual}$, of the commodity generally refers to a meter reading or a usage reading. The variable "time i" refers to instances of time during the current billing period. It may be expressed in synchronous intervals, such as by minutes, tenth of an hour, quarter of an hour, hours, or days. For example, "time i" may be in 15-minute increments. Alternatively, the variable "time i" may be asynchronously acquired. It may, for example, be expressed in terms of event identifiers, such as when the meter or usage is read.

The unusual usage profile is the triggering condition that defines an unusual usage. It may be defined by Eqn. 2, where the profile is a baseline historical usage, $U_{historical}$, scaled by a threshold percentage, $T_{percentage}$. The historical usage, $U_{historical}$ serves as a baseline. The profile may be linear over the number of days in the billing period, N.

$$U^i_{unusual} = \frac{U_{historical} \times T_{percentage}}{N} \quad \text{(Eqn. 2)}$$

Figure 11:
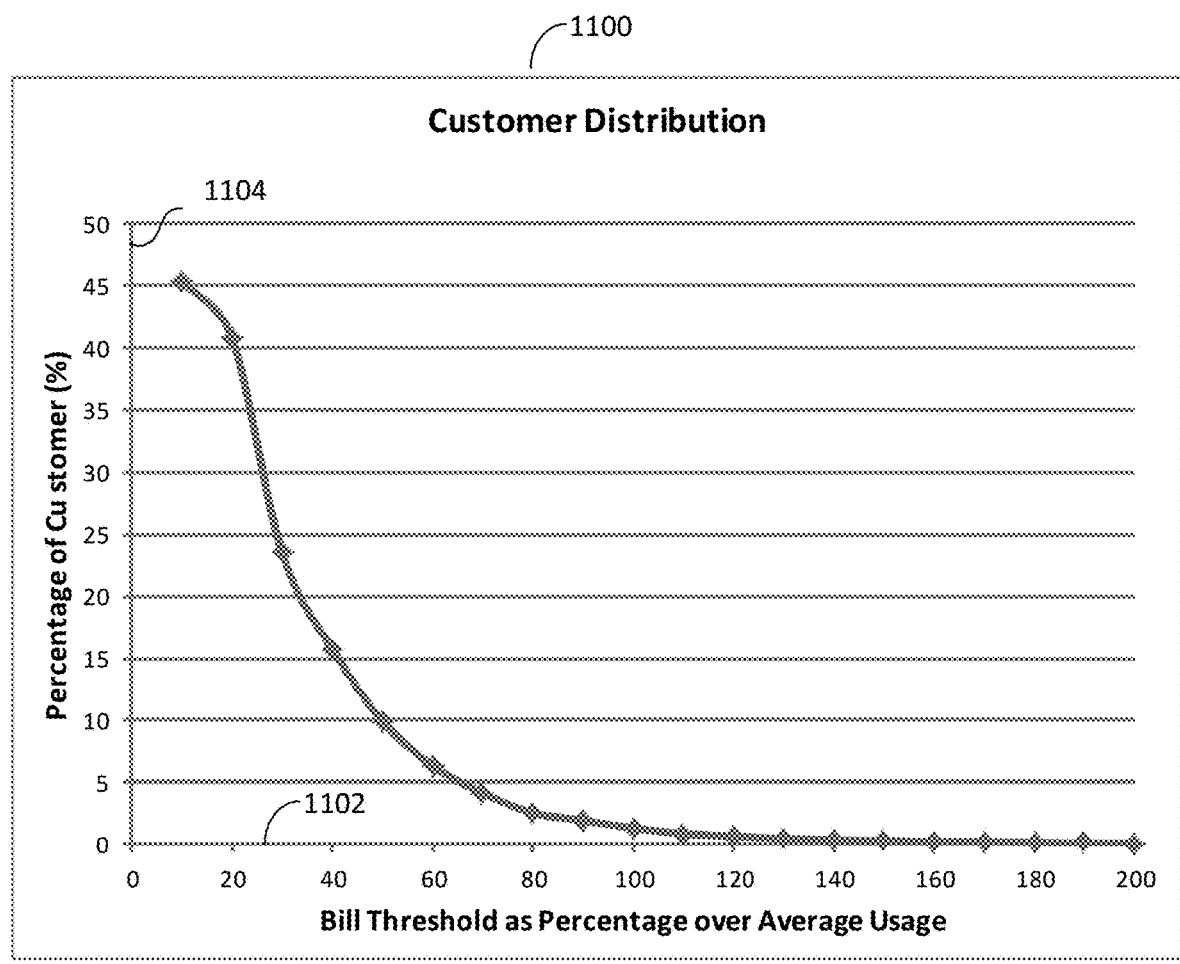
FIG. 11 illustrates a plot of a distribution of customers having usages exceeding their historical averages.

Threshold percentage is referred herein as the pre-defined threshold. The threshold percentage is preferable established around 130 percent. However it may vary between 100 percent and 200 percent. The consumer may receive recommendations of the setpoint to use and how it may correspond to various conservation efforts. FIG. 11 illustrates a plot 1100 of a distribution of customers having usages exceeding their historical averages. In the x-axis 1102, a percent of usage exceeding the historical averages is shown. Here, the data is analyzed between 0% and 200%. The percent of usage exceeding the historical averages refers to the threshold percentage. In the y-axis 1104, a percent of customer having a bill in a billing period that exceeds the threshold percentage is shown. As such, for a given threshold percentage, the computer system may determine the percentage of customers who may receive an alert. The historical average may be based on the customer's own usage history and may be compared based on the bill period (e.g., same month). Here, at a threshold percentage of 140%, approximately 15% of the customers have at least one bill that exceeds this threshold.

Alternatively, the $T_{percentage}$ value may be established such that fewer than three alerts are expected to be sent on average to each consumer. The $T_{percentage}$ value may also be established to maximize the number of consumers that would receive a report. For example, the threshold may be established by using a set of historical customer usage data for a given utility and determining the distribution of alert occurrences for different threshold levels. The distribution may be analyzed using a histogram. The $T_{percentage}$ value may be the threshold level with the maximum number of customers receiving at least one alert. The analysis may be performed across several seasons to reduce seasonal variability.

The baseline historical usage, $U_{historical}$, may be derived from past usage during similar seasonality. In the various embodiments, the past usage may correspond to usage from one year ago. The past usage data may be an average for the same month across different years.

The triggering condition 306 may include unusual or anomalous cost. Eqn. 3 defines such a triggering condition where the actual cost of the commodity, $C^i_{actual}$, exceeds the unusual cost profile, $C^i_{unusual}$, at "time i."

$$\text{Triggering condition} = C^i_{actual} > C^i_{unusual} \quad \text{(Eqn. 3)}$$

The unusual cost profile, $C^i_{unusual}$, may be defined by Eqn. 4, where the profile is a baseline historical cost, $C_{historical}$, scaled by a threshold percentage, $T_{percentage}$. The profile may be linear over the number of days in the billing period, N.

$$C^i_{unusual} = \frac{C_{historical} \times T_{percentage}}{N} \quad \text{(Eqn. 4)}$$

Additionally, a consumer may personalize his or her threshold by providing a preference on the frequency of the alert. As a result, rather than an input of the threshold percentage, the system may provide options for a desired alert frequency, such as "normal", "more frequent", or "less frequent". Then based upon the selected desired alert frequency, the computer system may adjust a personalized threshold percentage $T_{percentage\_customer\_x}$ for a given customer. For a normal alert frequency, the computer system may determine a $T_{percentage}$ value that would provide, for example, at least three alerts in a year. As such, a "more frequent" alert selection may correspond to a $T_{percentage}$ value that would provide an additional alert (e.g., four alerts). And a "less frequent" alert selection may correspond to a $T_{percentage}$ value that would provide fewer alerts (e.g., two alerts).

Figure 4:
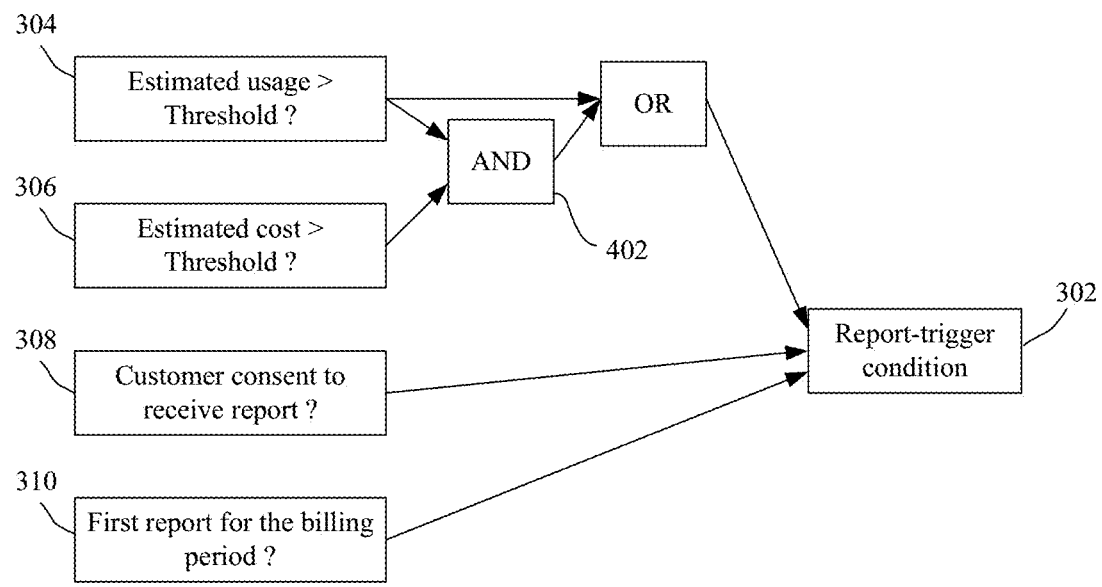
FIG. 4 is a diagram of report-trigger conditions according to an alternate embodiment.

FIG. 4 is a diagram of report-trigger conditions according to an alternate embodiment. The trigger condition for unusual cost may include both the cost and usage baseline exceeding a threshold. For example, the current billing period is May of Year 1. In May of Year 0, a consumer spent $100 for 100 kWh of electricity. For a threshold percentage of 130 percent, the triggering threshold may be established at $130 and 130 kWh. In this embodiment, for the triggering condition to be fulfilled, the estimated cost for the end of May would have to exceed $130 and that 130 kWh would have been used. Since the condition is based upon cost and usage, the system avoids reporting due merely to price fluctuations of the commodity. It should be appreciated by those skilled in art that differing threshold percentage values may be applied for cost and usage.

Alternatively, the unusual cost may be expressed in term of a change to environmental impact. Environmental impact may include, for example, carbon foot-print (shown in tons of carbon).

Environmental impact may also be expressed in terms of equivalents to other environmental quantities, for example, the number of miles driven, etc. Consumers may not understand their environmental impact based upon the tonnage of carbon that they generated, thus, the report may be alternatively expressed in relation to a more tangible reference. For example, the report may say that "the energy required to heat and/or to cool the home is equivalent to the consumer driving X number of miles." The report may also be expressed in a manner to promote conservation. For example, where the consumer has exceeded his or her usage, the report may suggest that the consumer should drive a certain number of miles in order to offset the environmental impact of the extra energy used to heat and/or cool the home.

The environmental benefits or impacts may be calculated using data stored in a look-up-table and applied to the cost and/or usage information. The computer system may use environmental benefits information as published by various government entities or other similar databases.

Referring back to FIG. 3, the report-trigger condition 302 may include permissive conditions, such as whether a consumer has given consent to receive the report 308 and whether the report will be the first report sent to the consumer during the current billing period 310. Permissive conditions may be referred to as eligibility conditions. Permissive conditions may promote the consumer's experience of receiving the reports. For example, in instances where the consumer did not provide consent to receive the report; the receipt of the report may cause confusion. Similarly, overly alerting the consumer may also result in the consumer ignoring the report. Other permissive condition may include the consumer being a residential consumer.

Another permissive condition may include whether the unusual usage is detected in the middle of the billing period 312. For example, in a four-week billing period, a two-week monitoring window may be employed as a permissive or eligibility condition.

Referring back to FIG. 1, the method may determine 106 an estimated usage for the current billing period for the remaining portion of the current billing period and determine 108 whether the estimated usage fulfills the report-trigger condition. Upon the report-trigger condition being fulfilled, the method includes outputting 110 a report.

Figure 5:
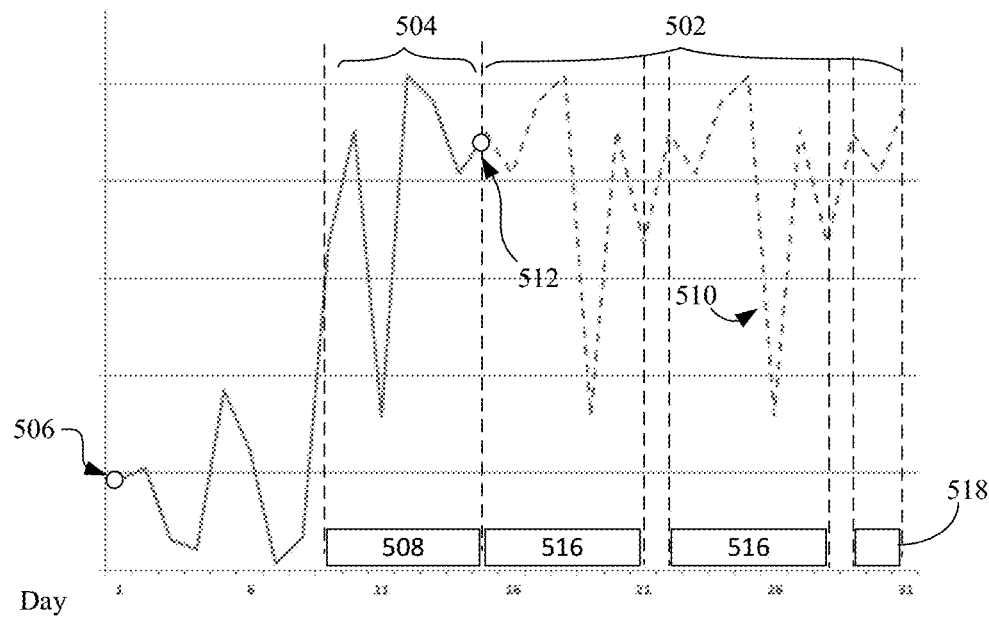
FIG. 5 illustrates aspects of forecasting of the consumer's usage for the remaining portion of the current billing period.

FIG. 5 illustrates aspect of forecasting the consumer's usage for the remaining portion of the current billing period. In various embodiments, the forecast of the consumer's usage for the remaining portion 502 of the current billing period may be based upon a trailing history 504 in the completed portion of the current billing period. The beginning 506 of the current billing period starts on Day 1 of the billing period. In this scenario, the current day 512 is Day 15. The remaining portion 502 of the current billing period is the remaining 16 days (Days 16-31) in a billing period of 31 days. When the trailing history 504 is longer than the completed portion of the current billing period, data from the previous completed billing period may be used. For example, at Day 2 of the May, the trailing history window may include Day 1 of May as well as the last six days of April.

In the various embodiments, the trailing history data 508 may be duplicated to serve as the forecast 510 for the remaining portion of the current billing period. Where the remaining portion 502 of the current billing period is longer than the trailing history 504, the trailing history data 508 may be duplicated multiple times to generate forecast data 516 and an end-of-the-forecast data 518. The end-of-the-forecast data 518 may be shorter than the forecast data 516 depending on the length of the remaining portion 502 of the current billing period. The forecast data 516 may be duplicated as a mirror of (i.e., reversed from) the trailing history data 508. This scheme provides more weight to the most recent usage data among the trailing history data 508, because the end-of-the-forecast data 518 is based on the most recent data from the trailing history data 508. Alternatively, the forecast data 516 may merely be duplicated in the same sequence as the trailing history data 508. Where the report explains the forecasting method to the consumer, this approach may be more easily understood by consumers.

In an embodiment, the trailing window data 508 may also be averaged to provide an average rate of usage. The average rate of usage may then be used to extrapolate the forecast usage for the remaining portion 502 of the current billing period.

The inventors of the present invention discovered that a seven-day to ten-day trailing window provides a reasonable usage estimation of the consumer's usage trend of up to a month. This window size beneficially accounts for the high and low usage during a time period, while also remaining in the same weather period. This window is also sufficiently small to not be affected by seasonality effects, which may skew the forecast.

It should be appreciated by those skilled in the art that longer or shorter trailing history may be employed without imparting from the disclosed embodiments. For example, by modeling weather patterns, the computer system may account for weather effects beyond the seven-to-ten days trailing window.

The computer system may determine 106 whether the estimated usage fulfills the report-trigger condition at predefined schedules during the current billing period. Where communicating meters are deployed, the meter may be read at one-minute, 15-minute, hourly, or daily increments. The operation may be performed to correspond to a new meter reading.

Figure 6:
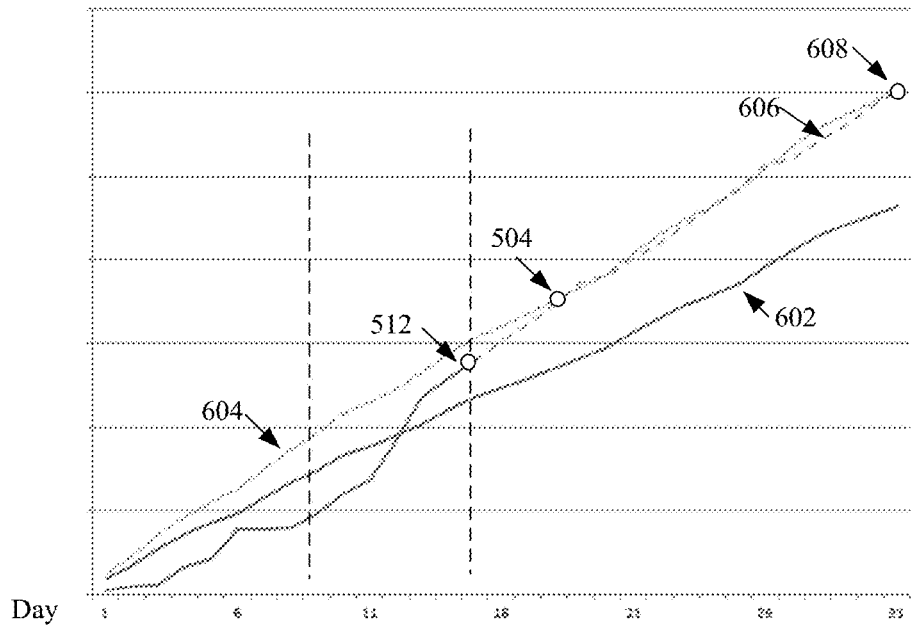
FIG. 6 is a diagram illustrating an operational aspect of the embodiments to determine, for each consumer, whether an estimated usage that has been established for the respective consumer for that current billing period fulfills the report-trigger condition.

Referring back to FIG. 1, the computer system determines 108 whether the estimated usage fulfills the report-trigger condition. FIG. 6 is a diagram illustrating an operational aspect of the embodiments to determine, for each consumer, whether an estimated usage that has been established for the respective consumer for that current billing period fulfills the report-trigger condition. In the various embodiments, the past usage data 602 is scaled by the $T_{percentage}$ cen value (for example, 130%) to establish a triggering threshold 604. In this example, at current day 512 (Day 15), the forecast usage 606 exceeds the triggering threshold 604 at Day 18, thus fulfilling the report-trigger condition.

Alternatively, the triggering condition may be based on the forecast usage 606 exceeding the triggering threshold 608 established at the end of the billing period. As shown, an unusual usage pattern by a consumer is detected within a few days of the elevated usage beginning. As such, the consumer has time to take action to curb their usage or spending.

A component of the estimated usage may include its duration, which establishes the length of the billing period. In the various embodiments, the current billing period may have a duration based on an average of three billing periods. Other forecast lengths may be employed, such as a fixed length.

In operation 110, the computer system outputs a report upon the report-trigger condition being fulfilled. The report may be formed in different ways. For example, it may include generating an electronic message, which may be an electronic mail message, a short message service (SMS) message, and/or an automated voice message. The report may be sent directly to consumers via such electronic messages. The report may also be sent to intermediaries, such as the utility companies or a service provider. The report may also be signals send to an electronic device located at a location associated with the consumer, such as a meter or a thermostat. The meter may be an advanced meter infrastructure (AMI) based meter or a meter with communication capabilities over a network.

The message may be personalized. The personalization provides greater confidence to the consumer that the information is relevant. For example, the personalization may include the alert type (unusual usage or cost), fuel type, as well as tips and education material to reduce usage. As a result, the likelihood of the consumer taking action increases.

The message may be formatted for electronic mail as shown in Table 1.

The consumer may also customize the settings for the report, such as the thresholds (maximum or minimum), as well as the maximum number of alerts to be received per billing period. The consumer may also indicate preferences on the method of delivery of the report.

Figure 12:
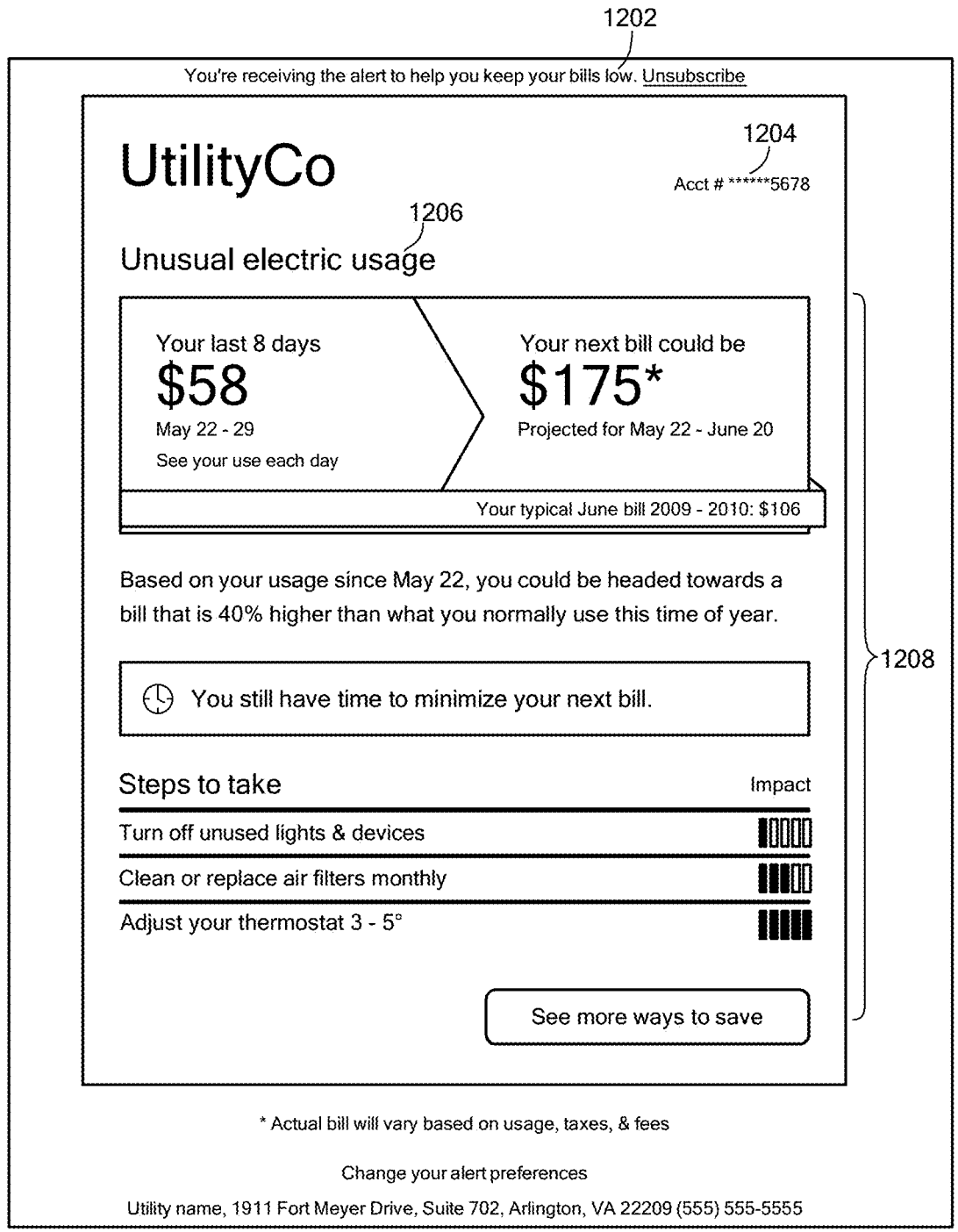
FIG. 12 illustrates an electronic mail report according to an illustrative embodiment.

FIG. 12 illustrates an electronic mail report according to an illustrative embodiment. As shown, the report includes the introductory statement 1202, the account number 1204, the alert title 1206, and the literature to improve usage reduction 1208.

The described method may be configured to monitor large numbers of consumers while distinguishing unusual usage from ordinary usage that is subject to ordinary fluctuations. In enabling consumers to manage their commodity use, the various embodiments provide for incremental efficiency results as well as greater consumer satisfaction. Additionally, the method may improve the user experience in ensuring that as many people as possible receive alerts and that the alert would be relevant and useful to them. This configuration may entail balancing the frequency of reporting with the frequency of false-positive condition when establishing the triggering threshold.

Figure 7:
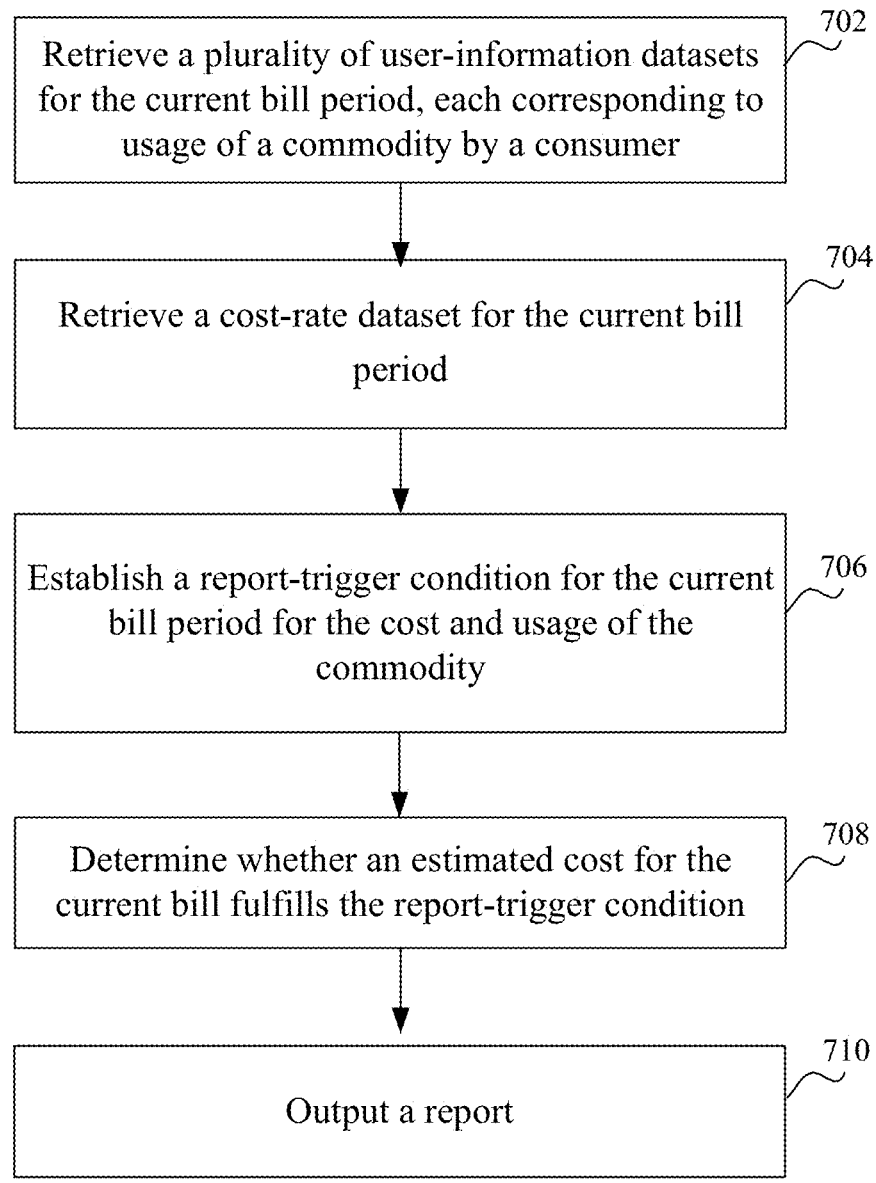
FIG. 7 is a flowchart of a computer-implemented method of reducing a usage or cost of a commodity by reporting to a consumer of unusual cost according to an alternate embodiment.

FIG. 7 is a flowchart of a computer-implemented method of reducing a usage or cost of a commodity by reporting to a consumer of unusual cost according to an alternate embodiment.

TABLE 1

Email subject:
Unusual <electric/natural gas> usage
Header info: Text here is the same for all cases, unless noted

| | Text | Description |
|---|---|---|
| Intro stmt | You're receiving this alert to help you keep your bills low. Unsubscribe | Short term: this links to SmartSource for the user to opt-out of all emails from Opower<br>Long term: Would be great if this could either link to astro or a configuration page so that you don't need to opt-out of all Opower emails (e.g. reports and unusual usage alerts) |
| Account number | Acct # ******XXXX | show asterisks for most digits, only showing actual last 4 digits |
| Alert title | Unusual <electric/natural gas> usage | This is the same as the email subject |
| Budget bill statement | This is not a bill: Youre on budget billing. | Only shown for customers on budget billing. Otherwise should be omitted. |

For short message service (SMS) message, the report may say "UTILCO: based on your recent Electric use, your projected bill is $102. Tip: Adjust the temp 3-5F to lower your bill." The report may also say "UTILCO: Your recent Electric use is 14% higher than typical for you this time of year. Tip: Adjust the temp 3-5F to lower your bill."

The report may include literature to improve usage reduction. The literature may include tips as shown in Table 2.

TABLE 2

| Electricity (summer and winter) | Impact | Natural gas (Summer and winter) | Impact |
|---|---|---|---|
| Steps to take | | <same> | |
| Turn off unused lights & devices | 1/5 | Shave a minute off shower time | 1/5 |
| Clean or replace air filters monthly | 3/5 | Clean or replace air filters monthly | 3/5 |
| Adjust your thermostat 3-50 | 5/5 | Adjust your thermostat 3-50 | 5/5 |
| See more ways to save | | <same> | |

A computer system may retrieve usage-information dataset corresponding to the usage of the commodity by the consumer 702, the usage-information dataset including past usage of the commodity during at least one of a completed billing period and a current usage of the commodity during a completed portion of the current billing period. The computer system may retrieve a cost-rate dataset for the current billing period 704. The cost-rate dataset may include tiered rates as well as peak and off-peak pricing.

The computer system may establish a report-trigger condition for the current billing period; the report-trigger condition being based from the past usage in the usage-information dataset 706. The computer system may determine whether an estimated cost for the current billing period fulfills the report-trigger condition 708 and outputs a report to the consumer 710 upon such conditions.

Figure 8:
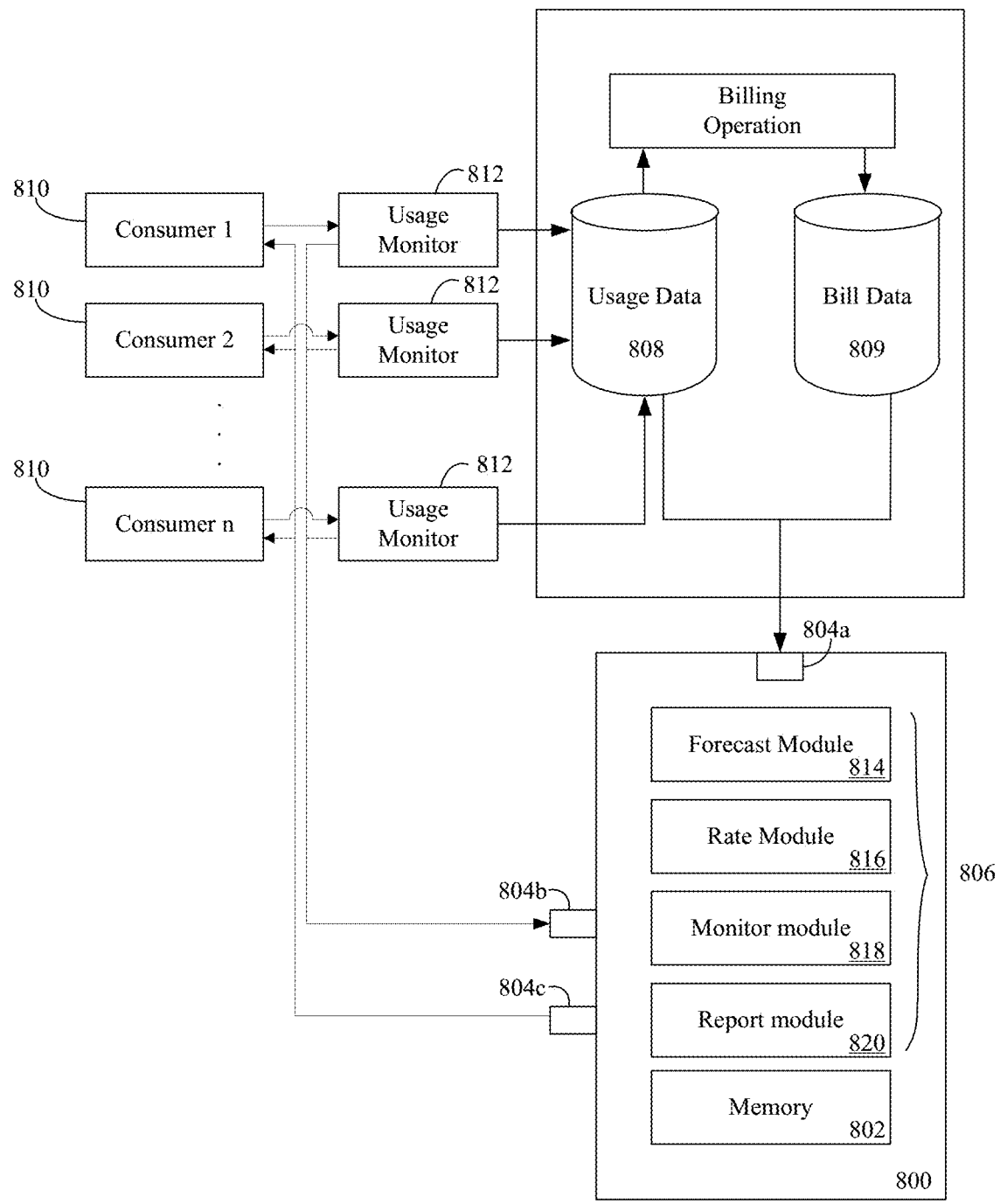
FIG. 8 is a diagram of a system according to the illustrative embodiment.

FIG. 8 is a diagram of a system according to the illustrative embodiment. The system reduces a usage or cost of a commodity by reporting to a consumer of an unusual cost or spending directed to use of a commodity. The system 800 includes a memory 802, communication ports 804*a-c*, and a control program 806.

The memory 802 is configured to store usage data 808 associated to a commodity. The usage data may include, in part, a usage-information dataset corresponding to usage of the commodity by a plurality of consumers. The usage-information may include, in part, past usage-information of the commodity during at least one of completed billing period and a current usage of the commodity during a completed portion of the current billing period. The past usage data may include bill data 809. The communication port 804c may be configured to transmit report data to a set of consumers 810, while the communication port 804a is configured to receive data with the utility database. The control program 806 is configured to control the memory 802 and the communication ports 804a-c. The control program 806 may include a forecast module 814, a rate module 816, a monitor module 818, and a report module 820. The control program 806 may also retrieve the usage-information dataset for a consumer, via communication port 804b that interfaces directly to meters 812. The control program 806 may establish a report-trigger condition for the current billing period for the consumer, where the report-trigger condition may be based at least in part from the past usage in the usage-information dataset. The control program 806 may determine an estimated usage for the current billing period based at least, in part, on usage for the completed portion of the current billing period and a forecast of usage for a remaining portion of the current billing period. The forecast of the usage may be generated by the forecast module 814. The control program 806 may continuously determine whether the estimated usage fulfills the report-trigger condition using the monitor module 818. If the estimated usage fulfills the report-trigger condition, the monitor module 818 may cause the report module 820 to output a report to the consumers 810 through the communication port 804c.

The communication ports 804b may be configured to interface to a meter, a thermostat, a data exchange interface of a cellular network, and other networks.

It should be appreciated by those skilled in the art that the communication ports 804a-c may be implemented individually or in combination. For example, the communication ports may be combined to a single internet port that interface to a local area network. The various communication ports may be implemented on several servers that interface to the respective networks. For example, the communication port 804b may be a server that interfaces to utility meter. One example is a gateway FTP server to interface with utilities servers to allow for the transfer of data files. The communication port 804c may be implemented as an exchange server, such as UUA for short message service (SMS) gateways, electronic mail (email) using simple mail transfer protocol (SMTP), as well as interactive voice response (IVR). Application programming interface (API) may, for example, be used to control IVR and SMS.

Figure 9:
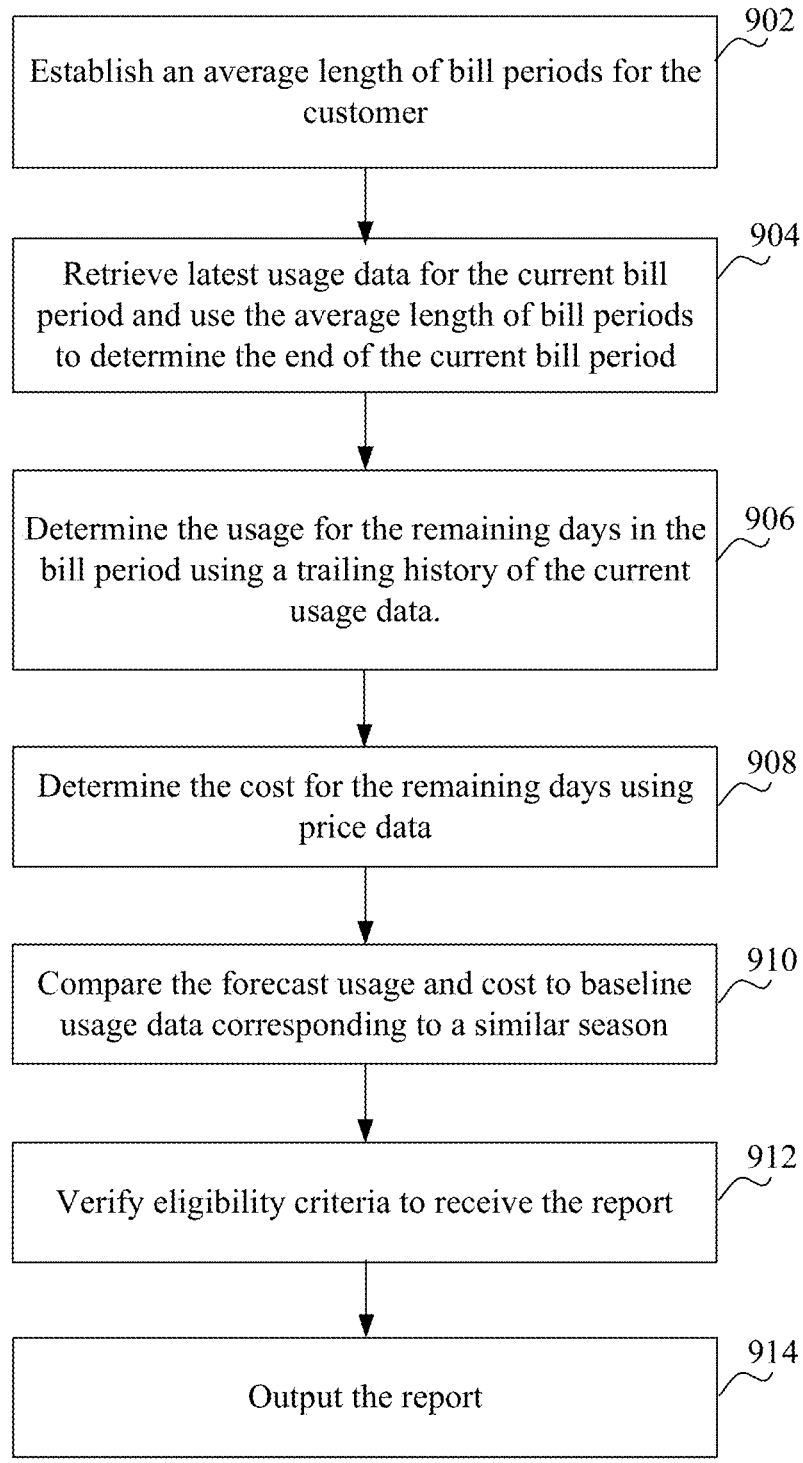
FIG. 9 shows a flowchart of a computer-implemented method according to an alternate embodiment.

FIG. 9 shows a flowchart of a computer-implemented method according to an alternate embodiment. A computer system may establish an average length of billing periods for the customer 902 to determine the end of the current billing period. For example, the average length of the bill periods may be between 28-31 days where the current bill period is monthly. The average length of the bill periods may be based on old bills including the past three billing periods up to the past twelve. In instances where less than three old bills exist, the computer system may use a default value provided by the utility company. The average length of the billing periods may be used to filter anomalously short billing periods, which may occur for new customers. As discussed, a bill period may be monthly, but other durations may be employed, including, for example, 45-days, 60-days, and 90-days.

The computer system may retrieve a usage data for the current billing period 904 to establish the end date of the current billing period. The computer system may retrieve the last billing usage read to determine the start date of the current billing period and average the billing period to project the end date of the current billing period.

The usage data may be in the data format as shown in Table 3.

TABLE 3

|  | Rates modeled text | Not modeled text |
| --- | --- | --- |
| Recent data header | Your last X days | <same> |
| Recent data | $XXX | XXX <kWh/therms/CCF> |
| Recent data date range | Mmm DD-Mmm DD | <same> |
| Link to astro: | View your usage | <same> |

The computer system may determine the usage for the remaining days in the billing period 906 by determining the usage to date of the current billing period and forecasting the remaining days in the current billing period. The forecasting may be based on the trailing window of the usage that may be between seven to ten days.

The computer system may use tiered rates, or peak and off-peak pricing to determine a projected cost for the remaining portion of the billing period 908. The computer system may store to a database the projected billing period, the usage and cost to date, the forecasted usage and cost.

The computer system may compare the forecast to a baseline to determine whether an unusual usage exists 910. The unusual usage may be defined as a baseline value, established from old bills of similar seasons, exceeding a defined threshold. If the condition is fulfilled, the computer system may verify the eligibility criteria to ensure the customer has opted in to receive the alerts, that the customer is residential, and that the report would be sent during the middle of the billing period 912. The unusual usage may be based on cost or usage. If cost is the trigger, the report may be outputted only if both the usage and cost threshold are exceeded 914. This condition would discount the effect of price increases, rather than usage increase.

Figure 10:
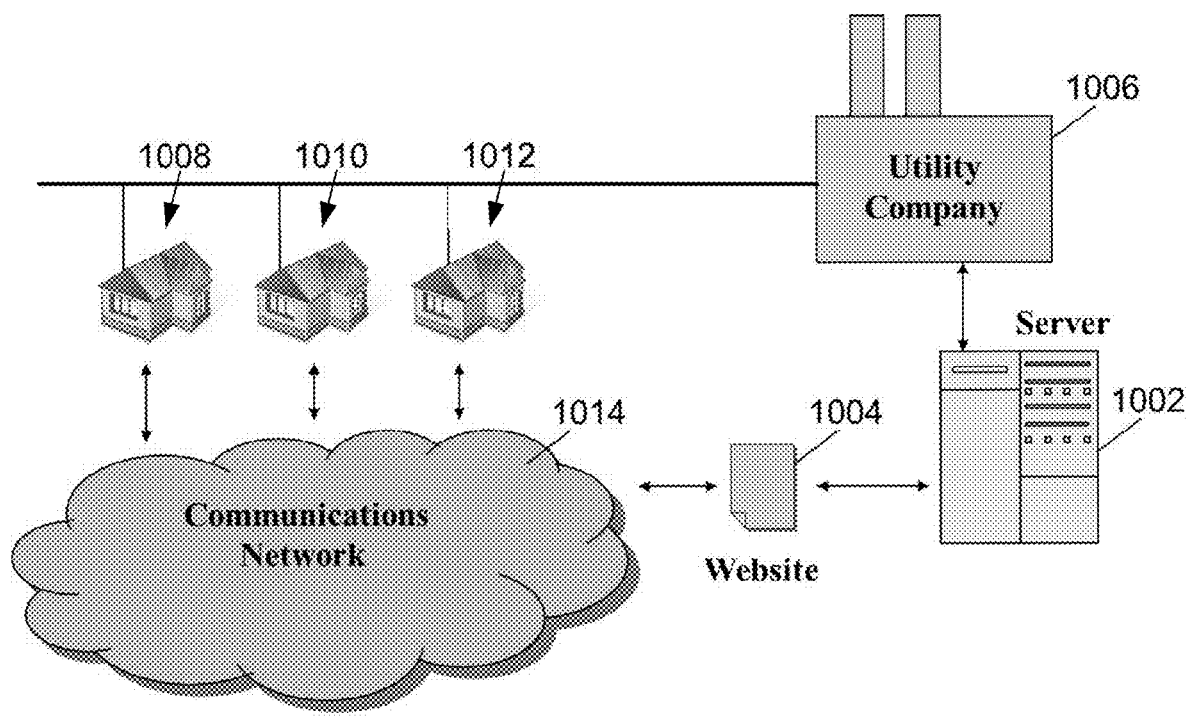
FIG. 10 shows embodiment according to the described illustrative embodiment.

FIG. 10 shows embodiment according to the described illustrative embodiment. The server 1002 receives data (i.e., historical and usage information) from the utility 1006. The server 1002 performs the computer-implemented method described above. If a report-trigger condition is satisfied, the server 1002 may communicate the information to consumers associated with those buildings 1008, 1010, and 1012. In various embodiments, the server 1002 communicates the report, or the alert, via the communications network 1014. For example, the server 1002 may send the report and/or alert in an e-mail. Alternatively, the consumer may log into a server supporting website 1004 and view the alert or the personalized message corresponding to the report. In addition, the server 1002 may print the report or may provide the information to a printing system so that the data can be provided to the consumer via regular mail (e.g., as part of a utility bill). In other embodiments, the report/alert is communicated back to the utility company 1006 so that the utility company 1006 can provide the report/alert to the consumer 1008, 1010, and 1012.

It should be noted that terms such as "processor" and "server" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internetworking technologies.

The various components of the control program may be implemented individually or in combination. For example, each component may be implemented or a dedicated server or a set of servers configured in a distributed manner.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other programmable logic device (PLD)), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A computer-implemented method of reducing a usage or cost of a commodity by reporting to consumers unusual usage of the commodity, the computer-implemented method comprising:
   retrieving, using one or more processors, a plurality of usage-information datasets, each usage-information dataset corresponding to usage of the commodity by a consumer based upon data retrieved from an energy management system at a premises of the consumer, each usage-information dataset including past usage of the commodity;
   generating, using the one or more processors, a distribution of predicted alert occurrences across a plurality of potential threshold levels using a set of historical customer usage data for the commodity from the plurality of usage-information datasets;
   analyzing, using the one or more processors, the distribution of predicted alert occurrences to select a first threshold level from amongst the plurality of potential threshold levels based at least in part on a determination that the first threshold level is predicted to, upon implementation as a report-trigger condition for a set of consumers, provide for at least one alert being sent to a maximum number of consumers of the set of consumers while sending less than a threshold number of alerts on average to each consumer of the set of consumers;
   establishing, using the one or more processors, a plurality of report-trigger conditions, each report-trigger condition corresponding to a consumer and based at least in part on a specified percentage of a baseline of the past usage in a usage-information dataset, the specified percentage corresponding to the first threshold level;
   determining, using the one or more processors, that an estimated usage established for a first consumer fulfills a first report-trigger condition, of the plurality of report-trigger conditions, for the first consumer;
   generating an electronic message including information to reduce usage of the commodity by the first consumer; and
   controlling transmission of the electronic message, via a network connection, to an electronic device comprising a thermostat at a premises of the first consumer, wherein the electronic message is configured to cause the electronic device to display at least a portion of the electronic message.

2. The computer-implemented method of claim 1, wherein the selecting the first threshold level is based at least in part on a determination that the first threshold level is predicted to be associated with less than the threshold number of alerts on average to each consumer.

3. The computer-implemented method of claim 1, wherein the selecting the first threshold level is based at least in part on a determination that the first threshold level is predicted to be associated with more than the threshold number of consumers receiving at least one alert.

4. The computer-implemented method of claim 1, wherein the past usage is during a period in a season that corresponds to a season of a current billing period.

5. The computer-implemented method of claim 4, wherein the plurality of report-trigger conditions comprise, for each consumer, the estimated usage for the remaining portion of the current billing period exceeding 130 percent of the past usage during a corresponding period.

6. The computer-implemented method of claim 1, wherein the electronic device includes a meter.

7. The computer-implemented method of claim 1, wherein the electronic message includes at least one of:
   an electronic mail message, a short message service (SMS) message, an automated voice message, or an electronic signal.

8. The computer-implemented method of claim 1, wherein the electronic device communicates with a device operating as a user portal at the premises of the first consumer.

9. The computer-implemented method of claim 1, wherein the commodity includes at least one of electricity, water, or gas.

10. The computer-implemented method of claim 1, wherein the first report-trigger condition is based at least in part on at least one of:
    usage of the commodity by the first consumer, or
    a present cost of the commodity.

11. The computer-implemented method of claim 1, wherein determining whether the estimated usage fulfills the first report-trigger condition is performed at a plurality of spaced-apart instances in time during a current billing period.

12. The computer-implemented method of claim 1, wherein determining whether the estimated usage fulfills the first report-trigger condition is performed after half of a current billing period has transpired, wherein the current billing period is at least four week in duration.

13. The computer-implemented method of claim 1, wherein determining whether the estimated usage fulfills the first report-trigger condition is performed after a pre-defined time within a current billing period.

14. The computer-implemented method of claim 1, wherein the unusual usage is during a current billing period, wherein the current billing period has a duration based at least in part on at least one of:
    an average of durations between three billing periods and twelve completed billing periods, or a default period.

15. The computer-implemented method of claim 1, wherein the threshold number is three or more.

16. The computer-implemented method of claim 1, wherein the plurality of report-trigger conditions includes, for each consumer, a data-value representing the consumer consenting to receiving the electronic message.

17. The computer-implemented method of claim 1, wherein the electronic message displays the unusual usage of the commodity as indicia of at least one of high cost, high usage, high environmental impact, or high carbon footprint.

18. The computer-implemented method of claim 1, further comprising:
    performing the analyzing across a plurality of seasons to reduce seasonal variability.

19. A computer-implemented method of reducing a usage or cost of a commodity by reporting to consumers unusual usage of the commodity, the computer-implemented method comprising:
    retrieving, using one or more processors, a usage-information dataset corresponding to usage of the commodity by a consumer, the usage-information dataset including past usage of the commodity;

retrieving, using the one or more processors, a cost-rate dataset;

generating, using the one or more processors, a distribution of predicted alert occurrences across a plurality of potential threshold levels using the usage-information dataset;

analyzing, using the one or more processors, the distribution of predicted alert occurrences to select a first threshold level from amongst the plurality of potential threshold levels based at least in part on a determination that the first threshold level is predicted to, upon implementation as a report-trigger condition for a set of consumers, provide for at least one alert being sent to a maximum number of consumers of the set of consumers while sending less than a threshold number of alerts on average to each consumer of the set of consumers;

establishing, using the one or more processors, a plurality of a report-trigger conditions, each report-trigger condition based at least in part on a specified percentage of a baseline defined from the past usage in the usage-information dataset and the cost-rate dataset, the specified percentage corresponding to the first threshold level;

determining, using the one or more processors, that an estimated cost for a first consumer fulfills a first report-trigger condition, of the plurality of report-trigger conditions, for the first consumer; and generating and providing for display to an electronic device, comprising a utility meter at a premises of the first consumer, an electronic message including information to reduce usage of the commodity by the first consumer.

20. The computer-implemented method of claim 19, wherein the estimated cost is based at least in part on a trailing history of a current cost.

21. The computer-implemented method of claim 19, wherein the cost-rate dataset includes a plurality of cost values associated a plurality of time instances within a current billing period.

22. The computer-implemented method of claim 19, wherein each of the report-trigger conditions is based at least in part on a forecast usage of the commodity by a consumer exceeding a pre-defined cost threshold.

23. A non-transitory machine-readable medium comprising program code stored thereon for execution by one or more processors, the program code configured to cause the one or more processors to perform a process of reducing a usage or cost of a commodity by reporting to consumers unusual usage of the commodity, the process comprising:

retrieving a plurality of usage-information datasets, each usage-information dataset corresponding to usage of the commodity by a consumer, each usage-information dataset including past usage of the commodity;

generating a distribution of predicted alert occurrences across a plurality of potential threshold levels using the plurality of usage-information datasets, each potential threshold level associated with a predicted number of alert occurrences;

analyzing the distribution of predicted alert occurrences to select a first threshold level from amongst the plurality of potential threshold levels based at least in part on a determination that the first threshold level is predicted to, upon implementation as a report-trigger condition for a set of consumers, provide for at least one alert being sent to a maximum number of consumers of the set of consumers while sending less than a threshold number of alerts on average to each consumer of the set of consumers;

establishing a plurality of report-trigger conditions, each report-trigger condition corresponding to a consumer and based at least in part on a specified percentage of a baseline of the past usage in a usage-information dataset, the specified percentage corresponding to the first threshold level;

generating a target set of consumers from the set of consumers to alert to reduce usage of the commodity by selecting and adding in the target set of consumers at least one consumer determined to be associated with an estimated usage that fulfills at least one report-trigger condition, of the plurality of report-trigger conditions, for the at least one consumer;

generating, using the target set of consumers, an electronic message for each consumer in the target set of consumers, wherein the electronic message includes information to reduce usage of the commodity; and controlling transmission of the electronic message based on the target set of consumers, wherein the electronic message is transmitted, via a network connection, to only electronic devices associated with each consumer in the target set of consumers, wherein each electronic device comprises a thermostat or a utility meter at a premises of one or more consumers.

24. A system comprising:

a memory configured to store usage data associated with a commodity;

one or more processors coupled to the memory;

a communication port coupled to the one or more processors, the communication port configured to transmit report data to a plurality of consumers; and a control program configured to:

control, using the one or more processors, the memory and communication port;

retrieve, using the one or more processors, a usage-information dataset for a consumer;

generate, using the one or more processors, a distribution of predicted alert occurrences across a plurality of potential threshold levels using the usage-information dataset, each potential threshold level associated with a predicted number of alert occurrences;

analyze, using the one or more processors, the distribution of predicted alert occurrences to select a first threshold level from amongst the plurality of potential threshold levels based at least in part on a determination that the first threshold level is predicted to, upon implementation as a report-trigger condition for a set of consumers, provide for at least one alert being sent to a maximum number of consumers of the set of consumers while sending less than a threshold number of alerts on average to each consumer of the set of consumers;

establish, using the one or more processors, a report-trigger condition for the consumer, the report-trigger condition based at least in part on a specified percentage of a baseline defined from past usage in the usage-information dataset, the specified percentage corresponding to the first threshold level, determine, using the one or more processors, that an estimated usage for the consumer fulfills the report-trigger condition; and generate and provide for display to an electronic device, comprising a thermostat or a utility meter at a premises of the first consumer, an electronic message including information to reduce usage of the commodity by the consumer.

25. The system of claim 24, wherein the communication port is configured to interface at least in part to at least one of a meter, a thermostat, a network, a data exchange interface of a cellular network or a data exchange interface to an email server.

* * * * *